April 2, 1940.    N. R. POST ET AL    2,195,631
PLOW
Filed July 31, 1937    3 Sheets-Sheet 3
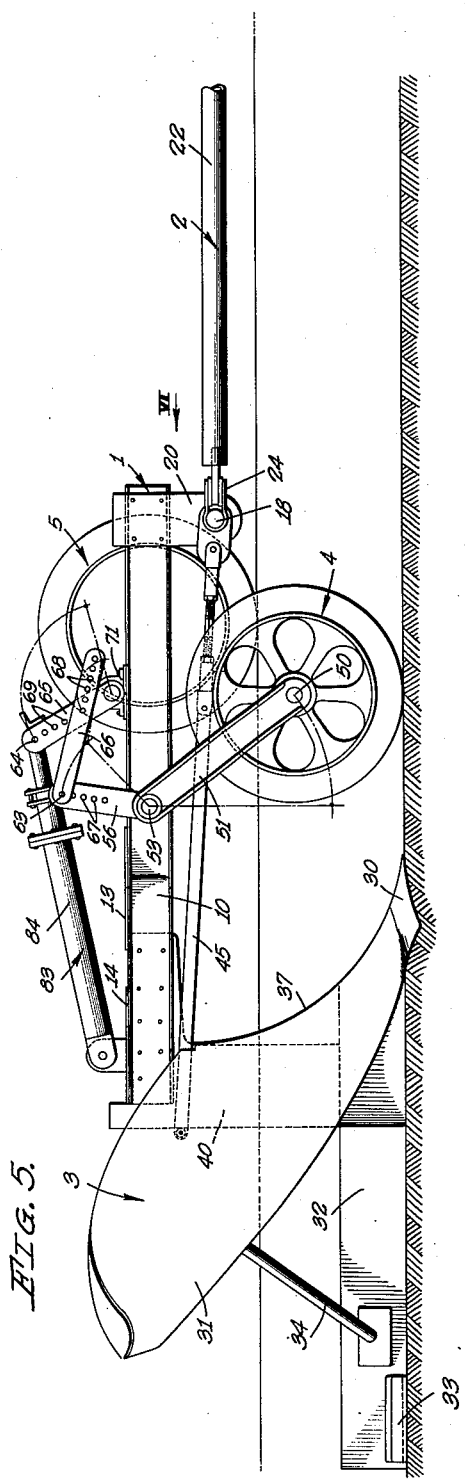
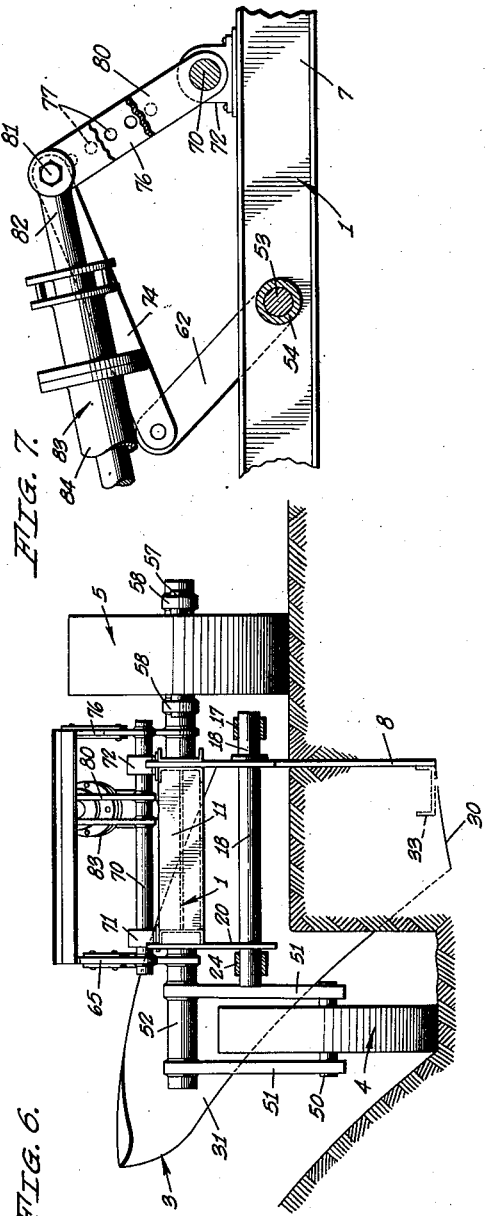
NORMAN R. POST
CHARLES R. POST
INVENTORS
BY *Lyon & Lyon*
ATTORNEYS.

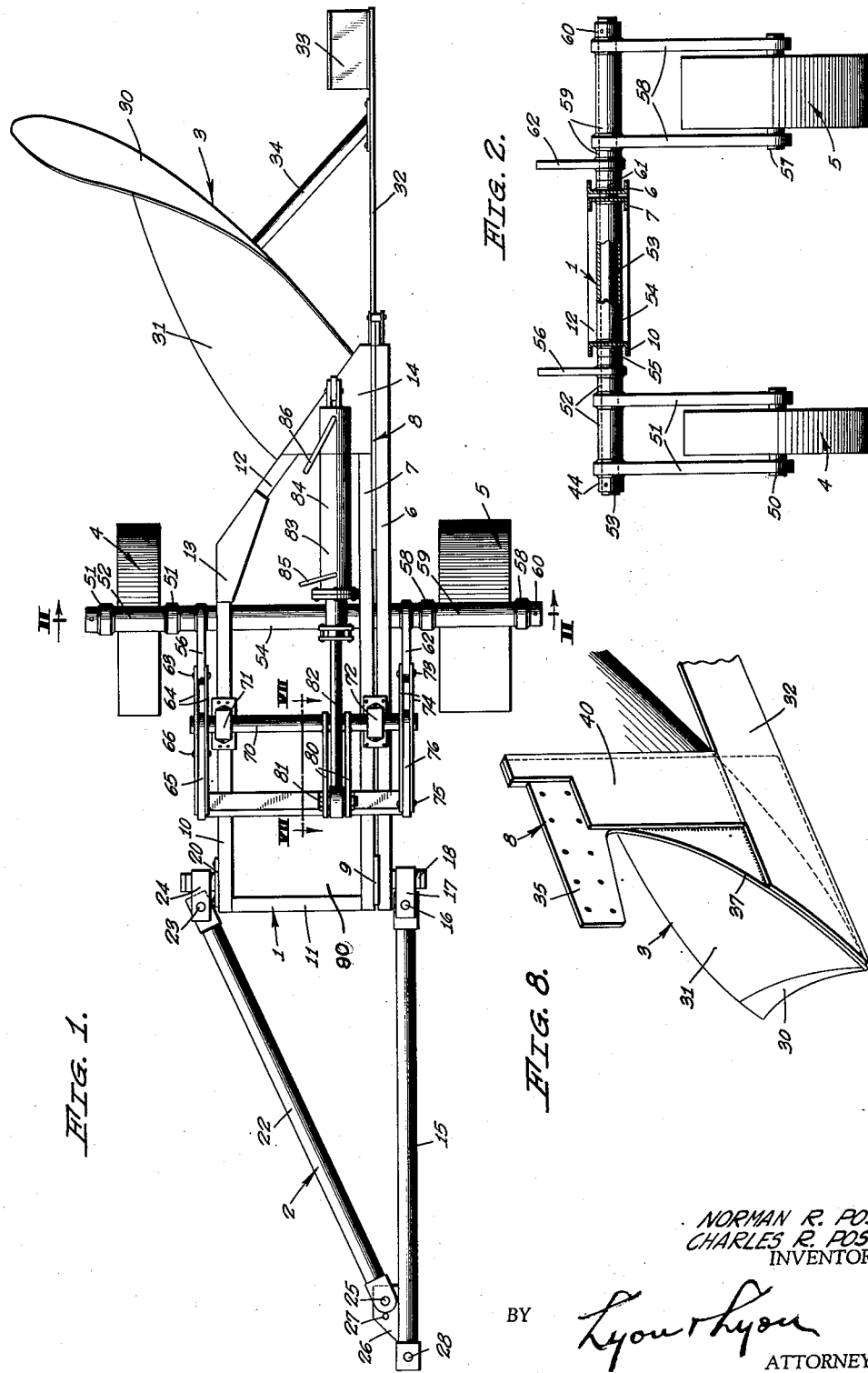

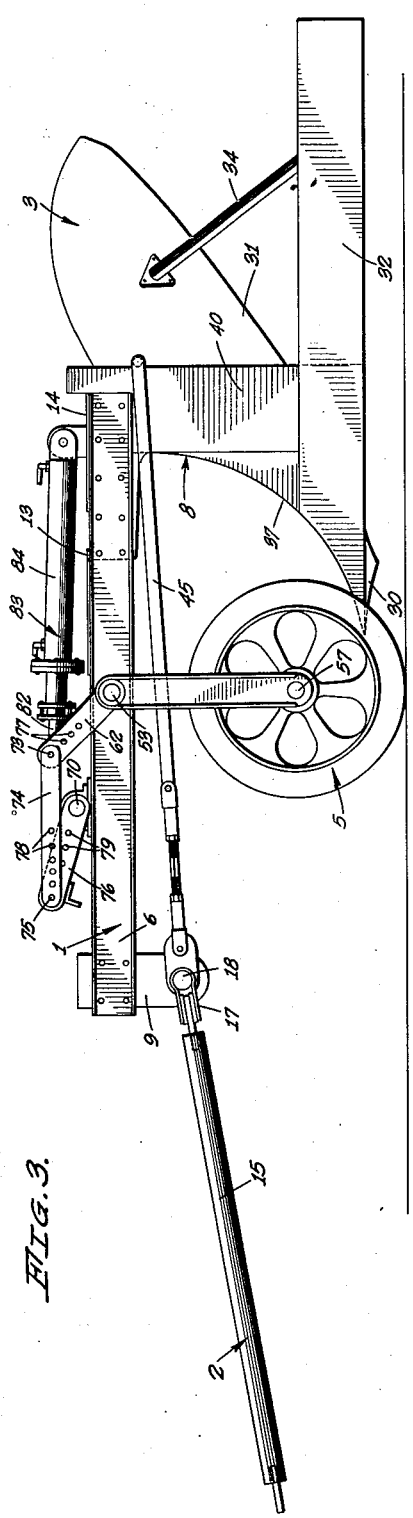

Patented Apr. 2, 1940

2,195,631

UNITED STATES PATENT OFFICE 2,195,631

PLOW

Norman R. Post and Charles R. Post,
Santa Ana, Calif.

Application July 31, 1937, Serial No. 156,716

4 Claims. (Cl. 97—103)

This invention relates to plows and more particularly to large plows adapted to plow very deep furrows.

A general object of the invention is to provide a practicable plow construction or design for use in plows of extremely large size for plowing extremely deep.

Another object of the invention is to provide a simple and effective mechanism for raising and lowering extremely large and heavy plows.

Still another specific object is to provide a simple mechanism for rasing and lowering two wheels on a plow different distances by means of a single actuating mechanism.

The manner in which the foregoing objects, together with other more specific objects of the invention are accomplished, will be explained by describing in detail, with reference to the drawings, a specific embodiment of the invention.

It has recently been discovered that in some agricultural regions it is very beneficial to occasionally, at intervals of several years, turn the land to a substantial depth of the order of from 3 to 6 feet. The only practicable way of doing this is by plowing, and it necessitates the use of a plowshare and moldboard of extremely large size for turning the soil to such depths.

The building of extremely large moldboard type plows introduces a number of new problems. Thus, because of the size of the plowshare and moldboard, relatively great traction force is required to move it through the soil and special frame and connecting members, together with special plowshare, moldboard and landside construction is required to obtain the strength that is essential without unnecessary weight and expense. Another problem encountered in the construction of extremely large plows is that of manipulating the plow in the field. Thus the plow must be conveyed to the field while in inoperative position and then manipulated to adapt it for plowing. The ordinary hand plow, because of its relatively small size, can be readily manipulated by the operator through the guide handles. The ordinary sulky plow, on which the driver rides, can be readily raised or lowered out of or into plowing position by means of levers manipulated directly by the operator. However in the case of extremely large plows of the type dealt with herein, such hand manipulation of the plow is out of the question because of the great weight of the plow and the forces to which it is exposed. We therefore provide a power-actuated lifting and lowering mechanism whereby the manipulation of the plow is under the control of but not dependent upon the physical strength of the operator. Inasmuch as large plows of the type herein dealt with are usually drawn by tractors, which can be readily fitted with pumps for providing fluid under pressure, we preferably provide a fluid pressure-actuated mechanism for raising and lowering the plow. We have also found it desirable, in the construction of large plows, to provide two wheels on opposite sides of the plowshare, which wheels support the plowshare clear of the ground when no plowing is being done. However when the plow is in operation and turning a furrow, one of the wheels rides in the furrow while the other one rests on the ground surface. This necessitates the positioning of one wheel substantially higher than the other during plowing operations whereas when the plow is raised clear of the ground the two wheels are preferably at substantially the same level. Of course the two wheels could be independently actuated through different desired distances by two separate actuating mechanisms. In accordance with the present invention, however, we provide a coupling mechanism such as to permit raising and lowering of the two wheels by different adjustable amounts by a single fluid-actuated piston.

A specific embodiment of the invention will now be described in detail with reference to the drawings, in which Fig. 1 is a plan view of a plow in accordance with our invention.

Fig. 2 is a vertical section taken aproximately in the plane II—II of Fig. 1.

Fig. 3 is a side elevation view of the plow taken from the left side with the plow in raised or non-plowing position.

Fig. 4 is a side elevation view also taken from the left side but showing the plow in lowered or plowing position.

Fig. 5 is a side elevation of our plow taken from the right side and showing the plow in plowing position. In other words, Fig. 5 is similar to Fig. 4 but taken from the opposite side.

Fig. 6 is a front view of our plow in plowing position, the view being taken looking in the direction VI of Fig. 5.

Fig. 7 is a detail view of a portion of the plow-elevating mechanism, taken in the plane VII—VII of Fig. 1, with the plow in the position shown in Fig. 5.

Fig. 8 is a perspective view of a portion of the plow moldboard, landside and supporting frame.

Referring first to Fig. 1, our plow comprises as its essential elements, a frame or chassis 1, and a drawbar assembly 2 for applying traction to the chassis 1, a plow 3, rigidly attached to the chassis 1, a right wheel 4, a left wheel 5, and a mechanism for connecting the wheels 4 and 5 to the chassis 1 for vertical adjustment relative thereto.

The chassis 1 comprises a pair of relatively long frame members 6 and 7, preferably consisting of a pair of channel iron members positioned back to back in spaced relation on opposite sides of a plate 8 which supports the plow 3. The plate 8 does not extend the full length of the members 6 and 7 but is positioned between the rear portions of the latter. The channel members 6 and 7, however, are parallel to each other throughout their length and spaced apart at their front ends by a suitable spacing plate 9. The two channel members 6 and 7 together constitute one side of the chassis 1. The other side of the chassis 1 comprises a single channel member 10 somewhat shorter than the channel members 6 and 7 and positioned with its front end opposite the front ends of members 6 and 7. This member 10 is connected at its front end to the front end of the channel member 7 by a front cross member 11 and the rear end of the channel member 10 is connected to the rear end of channel member 7 by a rear diagonal frame member 12 which may also be a channel section element. The connection between the rear end of the member 10 and diagonal member 12 may be reinforced by a plate 13 welded thereto and the connection between the rear ends of the diagonal member 12, and side member 7 is reinforced by a substantially triangular plate 14 welded thereto. As clearly shown in Fig. 1, the plates 13 and 14 lie on top of the members 10 and 12 and the members 12 and 7, respectively. To further reinforce the frame and particularly to increase its resistance to twisting, a plate 90 is secured to the bottoms of the members 10, 12, 7 and 11, this plate being preferably welded all along its outer edge to the members 10, 12, 7 and 11 and forming a solid bottom wall for the frame.

The hitch or drawbar assembly 2 comprises a main drawbar 15 pivotally connected at its rear end by a pin 16 to a link 17 which is in turn rotatably mounted on the left end of a heavy shaft 18 which extends transversely below the front end of the chassis 1 and is rigidly secured thereto. Thus the left end of the shaft 18 passes through and is welded or otherwise secured to the spacer plate 9 which extends a substantial distance below the frame members 6 and 7. Adjacent its right end the shaft 18 extends through and is secured to a plate 20 which (Fig. 6) is secured to and extends below the chassis member 10. In addition to the main drawbar 15 which extends approximately in the same direction as the frame members 6 and 7, we provide an auxiliary drawbar 22 which is pivotally connected at its rear ends by a pin 23 to a link 24 which is rotatably mounted on the right end of the shaft 18. The front end of the auxiliary drawbar 22 is pivotally connected by a pin 25 to a plate 26 rigidly secured to the front end of drawbar 15. This plate 26 may be provided with several apertures 27 to permit lateral adjustment of the front end of the main drawbar 15. In use, traction is applied to a coupling member 28 on the front end of the drawbar 15.

The plow 3 conforms in general design to the standard practice, comprising a plowshare 30 which merges into a moldboard 31 and a landside 32. The rear end of the landside 32 may be provided with a step 33 for an operator to ride upon. A supporting brace 34 may also be provided extending from a point on the landside 32 adjacent the rear end thereof to substantially the midportion of the moldboard 31 to maintain those parts in rigid spaced relation to each other.

As previously indicated, the plow 3 is connected to the chassis frame 1 by plate 8 clamped between the members 6 and 7. The plate 8 is irregularly shaped, and, (referring to Fig. 8), comprises an upper portion 35 of substantial length, which is clamped between the chassis members 6 and 7 and riveted thereto. From the rear end of the upper portion 35 the rear edge of plate 8 extends substantially vertically, passing alongside and substantially to the bottom of the landside 32. The forward edge of the plate 8 below the upper portion 35 is curved forwardly and downwardly and extends flush with and is welded to the advance or cutting edge 37 of the moldboard 31. In fact the lower portion of the front curved edge of plate 8 extends between the edge of the moldboard 31 and the advance edge of the landside 32, being welded to both of those elements along its line of contact therewith.

The plate 8 is further reinforced by a plate 40 of substantially the thickness of the landside 32 which extends from the upper edge of the landside 32 flat against the left side of plate 8 up to the lower side and past the rear end of the chassis member 6. The reinforcing plate 40 is preferably welded at its edges to the landside 32 and the plate 8.

A reinforcing rod 45 preferably extends from the rear edge of the plates 8 and 40 direct to the drawbar across shaft 18 to apply a portion at least of the draft directly to the plates 8 and 40 and relieve a portion of the strain between the chassis members 6 and 7 and the plate 8.

Referring now to the wheel and wheel-supporting structure, the wheel 5 on the left side of the implement is relatively wide and intended to ride upon the undisturbed earth to the left of the furrow during a plowing operation, whereas the right wheel 4 is shown somewhat narrower and during a plowing operation rides in the furrow made during the previous lap of the plow. Both wheels are rotatably mounted on arms which in turn are rotatable about a common axle. Thus the wheel 4 is rotatably mounted by any suitable bearing structure on a short axle 50 secured between the outer ends of a pair of parallel arms 51, which arms straddle the wheel 4 and are fixed at their upper ends to a sleeve 52 which is rotatably mounted on the right end of a rigid axle 53, which axle extends through a stationary sleeve 54 attached at opposite ends to the chassis members 10, 7 and 6, respectively, apertures being provided in the members 10, 7 and 6 for the passage of the axle 53. A collar 44, secured to the right end of axle shaft 53 and a spacing collar 55 prevent longitudinal motion of the sleeve 52 on axle 53. Sleeve 52, in addition to being rigidly connected to the arms 51 also has rigidly connected thereto an actuating arm 56.

Wheel 5 is also mounted by any suitable bearing means on a short axle 57 supported between the outer ends of a pair of arms 58 which straddle the wheel 5 and are rigidly secured at their upper ends to a sleeve 59 mounted on the left end of the axle shaft 53. Sleeve 59 is restrained against movement along the axle 53 by collar 60 on the outer end of the axle and a spacer element or washer 61 positioned between the inner end of sleeve 59 and the frame member 6. Sleeve 59 has rigidly attached thereto and extending upwardly therefrom an arm 62.

By moving the arms 56 and 62 the sleeves 52 and 59, respectively, can be rotated on the axle shaft 53 to swing the wheels 4 and 5 about the axle and thereby vary the vertical positions of the wheels with respect to the axle 53 and the chassis 1. The mechanism for moving these arms 56 and 62 will next be described.

Referring to Fig. 1 it will be observed that the arm 56 is connected by a pin 63 and a pair of links 64 to an arm 65, which arm is rigidly secured to a cross-shaft 70 rotatably mounted in bearings 71 and 72 on the chassis 1, pivotal connection being effected between the link 64 and arm 65 by pin 66 passing through apertures provided therefor in the links and arms. It will be observed from an inspection of Fig. 5 that a plurality of holes 67 are provided at spaced intervals along the arm 56; a plurality of holes 68 are provided at spaced intervals along the links 64 and a plurality of holes 69 are provided at spaced intervals along the arm 65. By inserting the pin 63 in different holes 67 and inserting the pin 66 in different holes 68 and 69 the wheel 4 may be adjusted to different positions with respect to the axle 53 for a given fixed position of the arm 65.

Referring again to Fig. 1, the arm 62, associated with wheel 5 on the left side of the implement, is connected by a pin 73 to a pair of links 74 which links are also connected by a pin 75 to a second arm 76 rigidly attached to the cross-shaft 70. Now referring to Fig. 3 showing the left side of the implement, it will be observed that the arm 62 has a plurality of spaced holes 77; the links 74 having a plurality of spaced holes 78; and the arm 76 has a plurality of spaced holes 79; so that by positioning the pin 73 in different holes 77 and positioning the pins 75 in different holes 78 and 79, various positions of the wheel 5 may be had for a given position of the shaft 70 and the wheel 5 can be made to respond in different degree to a given movement of the shaft 70.

The shaft 70, in addition to the arms 65 and 76 thereon, is provided with a pair of parallel arms 80 which are connected by a pin or bolt 81 to the outer end of the piston rod 82 of a piston and cylinder assembly 83 comprising a cylinder 84 and a piston within the cylinder rigidly connected to the piston rod 82. At its rear end the cylinder 84 is hingedly connected to the chassis 1 for oscillatory movement in a vertical plane. Fluid may be supplied to either end of the cylinder 84 under pressure and exhausted from the other end of the cylinder through hose connections 85 and 86 adapted to extend through any suitable valve control system to a pressure fluid source which may be a pump and reservoir mounted on a tractor adapted to pull the implement.

As shown in Figs. 1 and 3, the piston rod 82 has been moved into maximum outward position by delivering pressure fluid through hose 86 and exhausting it through hose 85. In this position the arms 80 on the shaft 70 extend forwardly and almost horizontally and the effective lengths of the arms 76, 65 and links 74, 64, and the arms 56 and 62 are so adjusted by inserting the pins 73, 75, etc. in the appropriate holes in the links and arms as to cause the arm 65, link 64 and arm 56 to rotate the sleeve 52 in such a position that the arms 51 and supporting wheel 4 extend substantially vertically. Likewise the effective lengths of the arm 76, links 74 and arm 62 are so adjusted that the arms 58 and supporting wheel 5 extend substantially vertically. Since arms 51 and 58 are of the same length, the wheels 4 and 5, respectively, are at the same elevation and the chassis 1 is supported on a level keel at such height above the ground as to support the plow 3 clear of the ground. This is the normal position of the plow in inoperative, or non-plowing, adjustment.

Referring now to Figs. 4, 5 and 6 which show the implement in plowing position, it will be observed that the piston rod 82 has been withdrawn the maximum distance into the cylinder 84 by admitting pressure fluid through hose 85 and exhausting it through hose 86. In this position the arms 80 have been rotated forwardly and rearwardly through an angle slightly greater than 90°, the shaft 70 and the arms 65 and 76 being rotated through a similar angle. In this position, as shown in Fig. 5, the arms 51, supporting the wheel 4, have been rotated forwardly (with respect to the direction of movement of the plow) through a relatively short angle by virtue of the fact that the links 64 are pivotally connected to the arms 65 at a point thereon relatively close to the shaft 70 and are pivotally connected to the arm 67 at a point relatively remote from the shaft 53. Therefore the wheel 4 is positioned at an elevation only slightly higher with respect to the chassis frame 1 than it occupied in the position shown in Figs. 1 and 3.

However the wheel 5 (Fig. 4) has been elevated a substantial distance by movement of its supporting arms 58 through an angle of approximately 90° so that the arms 58 extend forwardly substantially horizontally instead of vertically in the former position (Fig. 3). This greater movement of wheel 5 is obtained in response to the same rotation of shaft 70 by virture of the fact that the links 74 are pivotally connected to arm 76 very close to the extreme outer end thereof instead of close to the shaft 70 as was the situation in the case of the arm 65.

It will therefore be observed that by a single movement of the piston rod 82 through a fixed distance the wheel 4 has been moved vertically only a slight distance so that it is properly elevated to ride in the furrow during a plowing operation, whereas the wheel 5 has been raised a substantial distance into proper elevation to ride on the surface of the unplowed ground during a plowing operation.

Obviously by varying the points of connection between the various arms and links coupling the shaft 70 to the sleeves 52 and 59 the two wheels may be moved in any different desired degree to adjust the implement between nonplowing position and positions for plowing at different desired depths.

Although the invention has been explained by describing in detail a specific embodiment thereof, it is to be understood that various changes and modifications can be made in the particular structures shown without departing from the invention, and the invention is to be limited only to the extent set forth in the appended claims.

We claim:

1. A plowing implement comprising in combination: a chassis frame, a plow rigidly attached to said chassis frame, a pair of wheels positioned on opposite sides of said chassis frame for supporting the same, a shaft extending transversely of said chassis frame and means for supporting it with respect to said frame, a pair of sleeves rotatably mounted on said shaft in juxtaposed relation to said wheels, arms rigidly attached to and extending from said sleeves for supporting said wheels in radially spaced relation from said shaft, a second arm on each sleeve rigidly connected thereto, a second shaft parallel to and spaced from said first-mentioned shaft, said second shaft having a pair of arms thereon and rigidly connected thereto juxtaposed to said second arms on said sleeves, link means connecting said arms on said second shaft to said second arms on said sleeves for rotating the sleeves in response to rotation of said second shaft, and means for rotating said second shaft through a substantially fixed angle.

2. A plowing implement comprising in combination: a chassis frame, a plow rigidly attached to said chassis frame, a pair of wheels positioned on opposite sides of said chassis frame for supporting the same, a shaft extending transversely of said chassis frame, and means for supporting it with respect to said frame, a pair of sleeves rotatably mounted on said shaft in juxtaposed relation to said wheels, arms rigidly attached to and extending from said sleeves for supporting said wheels in radially spaced relation from said shaft, and means for rotating said sleeves to adjust the height of said wheels.

3. A plowing implement as described in claim 2, in which said means for supporting said shaft comprises a third sleeve rigidly attached to said frame, said shaft being freely rotatable in all three of said sleeves.

4. A heavy duty single share plowing implement for plowing to a depth of the order of 4 feet or more, comprising a box frame including a pair of rigid laterally spaced apart longitudinal members, rigid lateral members interconnecting said longitudinal members, all said members having substantial depth and being rigidly attached together, whereby said frame is especially resistant to twisting, a single plow rigidly attached to said frame and positioned below the rear end thereof, a pair of wheels positioned respectively on opposite sides of said frame in substantially juxtaposed relation to each other and in front of said plow, means adjustably connecting said wheels to said frame in supporting relation therewith, draw-bar means directly connected to said frame for pulling said implement, and said box frame including a plate extending thereacross rigidly connected at its edges to all said frame members whereby the resistance to twisting of said frame is increased.

NORMAN R. POST.
CHARLES R. POST.